(12) United States Patent
Kim

(10) Patent No.: US 9,190,639 B2
(45) Date of Patent: Nov. 17, 2015

(54) PROTECTING CASE

(71) Applicant: Justin Chiwon Kim, New York, NY (US)

(72) Inventor: Justin Chiwon Kim, New York, NY (US)

( * ) Notice: Subject to any disclaimer, the term of this patent is extended or adjusted under 35 U.S.C. 154(b) by 0 days.

(21) Appl. No.: 13/958,998

(22) Filed: Aug. 5, 2013

(65) Prior Publication Data

US 2015/0037618 A1    Feb. 5, 2015

(51) Int. Cl.
*H01M 14/00* (2006.01)
*H01M 2/10* (2006.01)
*A45C 13/02* (2006.01)
*A45C 15/00* (2006.01)
*H04B 1/16* (2006.01)
*H04M 1/18* (2006.01)
*A45C 11/00* (2006.01)
*H04M 1/02* (2006.01)
*H02J 7/00* (2006.01)

(52) U.S. Cl.
CPC ............. *H01M 2/1022* (2013.01); *A45C 11/00* (2013.01); *A45C 13/02* (2013.01); *A45C 15/00* (2013.01); *H04B 1/1615* (2013.01); *H04M 1/185* (2013.01); *A45C 2011/002* (2013.01); *A45F 2200/0516* (2013.01); *H01M 2200/10* (2013.01); *H02J 7/0013* (2013.01); *H02J 7/0045* (2013.01); *H02J 7/0047* (2013.01); *H02J 7/0063* (2013.01); *H02J 2007/005* (2013.01); *H02J 2007/0062* (2013.01); *H04M 1/0274* (2013.01)

(58) Field of Classification Search
CPC .............................. H01M 10/42; H01M 10/46
USPC .................................................. 429/7, 91, 96
See application file for complete search history.

(56) References Cited

U.S. PATENT DOCUMENTS

| | | | | |
|---|---|---|---|---|
| 6,043,626 | A * | 3/2000 | Snyder et al. | 320/113 |
| 2009/0186264 | A1* | 7/2009 | Huang | 429/96 |
| 2011/0228436 | A1* | 9/2011 | Lee et al. | 361/93.7 |

FOREIGN PATENT DOCUMENTS

| | | |
|---|---|---|
| KR | 20-2012-0000123 U | 1/2012 |
| KR | 10-2013-0006786 A | 1/2013 |
| KR | 10-2013-0045038 A | 5/2013 |

OTHER PUBLICATIONS

Mophie Juice Pack Pro, User Manual, Jun. 29, 2012, www.mophie.com.*
XP055091291, "TYLT-ENERGI-Sliding-PowerCase-Manual-iP5" 2013 TYLT. (2 pages, in English).
European Search Report issued Dec. 19, 2013 in counterpart European Patent Application No. 13182614.1-1653 (9 pages, in English).
Korean Office Action issued Aug. 28, 2014 in counterpart Application No. KR 10-2013-0093277. (6 pages, in Korean).

* cited by examiner

*Primary Examiner* — Ula C Ruddock
*Assistant Examiner* — Daniel Gatewood

(57) ABSTRACT

Provided is a protecting case for protecting an electronic device. The protecting case includes a protecting case body portion and a sliding case portion having an auxiliary battery cell embedded therein, the sliding case portion being electrically connected with the electronic device, supplying power to the electronic device, and being inserted into/drawn out from the protecting case body portion by sliding movement.

20 Claims, 13 Drawing Sheets

PROTECTING CASE

BACKGROUND OF THE INVENTION

1. Field of the Invention

The present invention relates to a protecting case for protecting an electronic device, and more particularly, to a protecting case including an auxiliary battery cell.

2. Description of the Related Art

Recently, various electronic devices have been provided to users and portable electronic devices, such as portable terminals, MP3 players, Portable Multimedia Players (PMPs), electronic books, and any other similar and/or suitable devices, which allow users to enjoy various contents while carrying them, have come into wide use.

The portable electronic devices are subject to special treatment, such as coating, for protection of outer surfaces thereof, but such special treatment may not protect every trivial damage that occurs in our daily lives.

Thus, to protect a portable electronic device, a protecting case is coupled to the portable electronic device.

Meanwhile, the portable electronic device, which has mainly intended for phone calls or Short Messaging Service (SMS) text transmission and reception, has recently added thereto various additional functions (for example, capturing of still or moving images, various utilities, games, and so forth) as smart phones have been developed. A smart phone that is currently in the market may implement various functions through a wireless network communication network from mail check to Internet use.

To execute various functions without any trouble, a high-capacity battery pack is required. That is, a conventional portable electronic device is supplied with power from a basic battery pack, and if the basic battery pack is discharged, the basic battery pack is separated and a preliminary battery pack is mounted and used.

However, a conventional protecting case does not separately include a rechargeable battery pack, such that when the portable electronic device uses up both the power of the basic battery pack and the power of the preliminary battery pack, the battery should be charged or another preliminary battery pack should be mounted and used on the portable electronic device. Moreover, due to such a limited battery capacity, inconvenient situations occur often during execution of various functions.

An external auxiliary battery has been widely used to increase the battery capacity of the portable electronic device, but a separate connection cable is required for electric connection between the external auxiliary battery and the portable electronic device, and the connection cable should be carried at all times.

Hence, there is a need for a device that includes a rechargeable auxiliary battery pack in the protecting case to supply charging power when coupled to the portable electronic device, to be electrically connected to the portable electronic device without using a connection cable, and also to protect the portable electronic device.

The above information is presented as background information only to assist with an understanding of the present disclosure. No determination has been made, and no assertion is made, as to whether any of the above might be applicable as prior art with regard to the present invention.

SUMMARY OF THE INVENTION

The present invention has been made to at least partially solve, alleviate, or remove at least one of problems and/or disadvantages described above.

Accordingly, various aspects of the present invention provide a protecting case including a sliding case portion having an auxiliary battery cell embedded therein, which is electrically connected with an electronic device without using a connection cable, supplies power to the electronic device, and is inserted into/drawn out from a protecting case body portion according to sliding movement, thereby facilitating power supply of the electronic device, making it easy to couple and separate the protecting case to and from the protecting case, and thus further improving protection of the electronic device that is a function of a product.

In addition, various aspects of the present invention provide a protecting case in which a terminal penetration portion is configured to electrically connect an external terminal (for example, an earphone jack, a headset jack, and a terminal jack) with an electronic device by penetrating the external terminal, thereby facilitating electric connection between the electronic device included in the protecting case and an external terminal.

Other objects to be provided in the present invention may be understood by embodiments described below.

According to an aspect of the present invention, there is provided a protecting case including a protecting case body portion and a sliding case portion having an auxiliary battery cell embedded therein, the sliding case portion being electrically connected with the electronic device, supplying power to the electronic device, and being inserted into/drawn out from the protecting case body portion by sliding movement.

According to another aspect of the present invention, there is provided a protecting case including a protecting case body portion having an opening formed in a lower portion thereof and a sliding case portion having an auxiliary battery cell embedded therein, the sliding case portion being electrically connected with the electronic device, supplying power to the electronic device, and being inserted into/drawn out from the opening by sliding movement.

According to further another aspect of the present invention, there is provided a protecting case including a protecting case body portion having an opening formed in a lower portion thereof and a sliding case portion having an auxiliary battery cell embedded therein, the sliding case portion being electrically connected with the electronic device, supplying power to the electronic device, and being inserted into/drawn out from the opening by sliding movement, in which the sliding case portion further includes a connection terminal electrically connected with the electronic device.

Other aspects, advantages, and salient features of the invention will become apparent to those skilled in the art from the following detailed description, which, taken in conjunction with the annexed drawings, discloses an exemplary embodiment of the invention.

BRIEF DESCRIPTION OF THE DRAWINGS

The above and other aspects, features and advantages of a certain embodiment of the present invention will be more apparent from the following detailed description taken in conjunction with the accompanying drawings, in which.

Throughout the drawings, like reference numerals will be understood to refer to like parts, components, and structures.

DETAILED DESCRIPTION OF THE EMBODIMENTS

Hereinafter, a protecting case for protecting an electronic device according to the present invention will be described with reference to the accompanying drawings.

Figure 1:
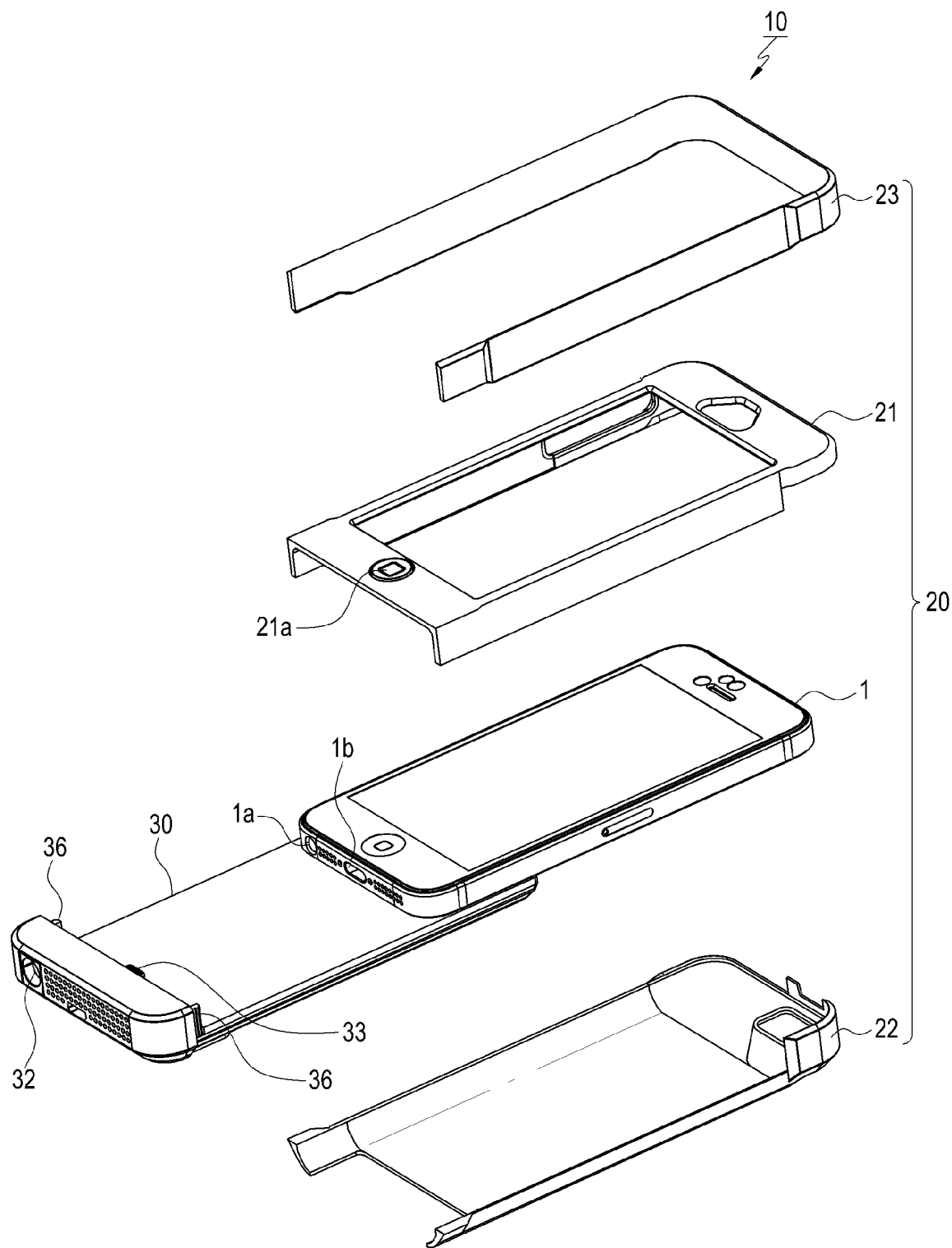
FIG. 1 is an exploded perspective view of a protecting case according to a first embodiment of the present invention.
Figure 2:
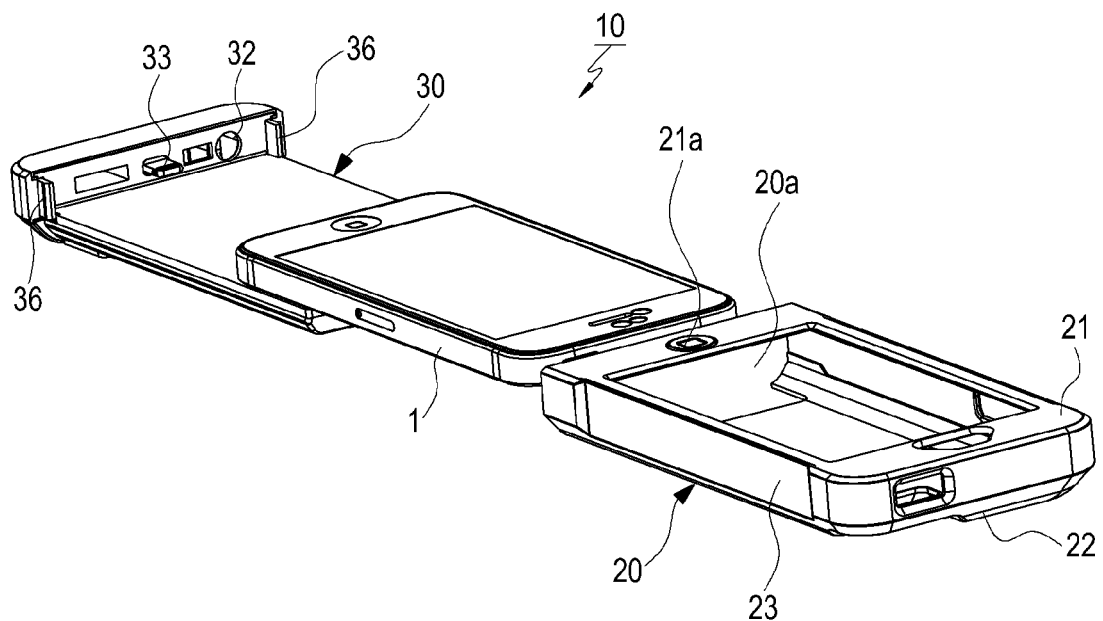
FIG. 2 is a perspective view showing a before-coupling state of a protecting case according to the first embodiment of the present invention is coupled.
Figure 3:
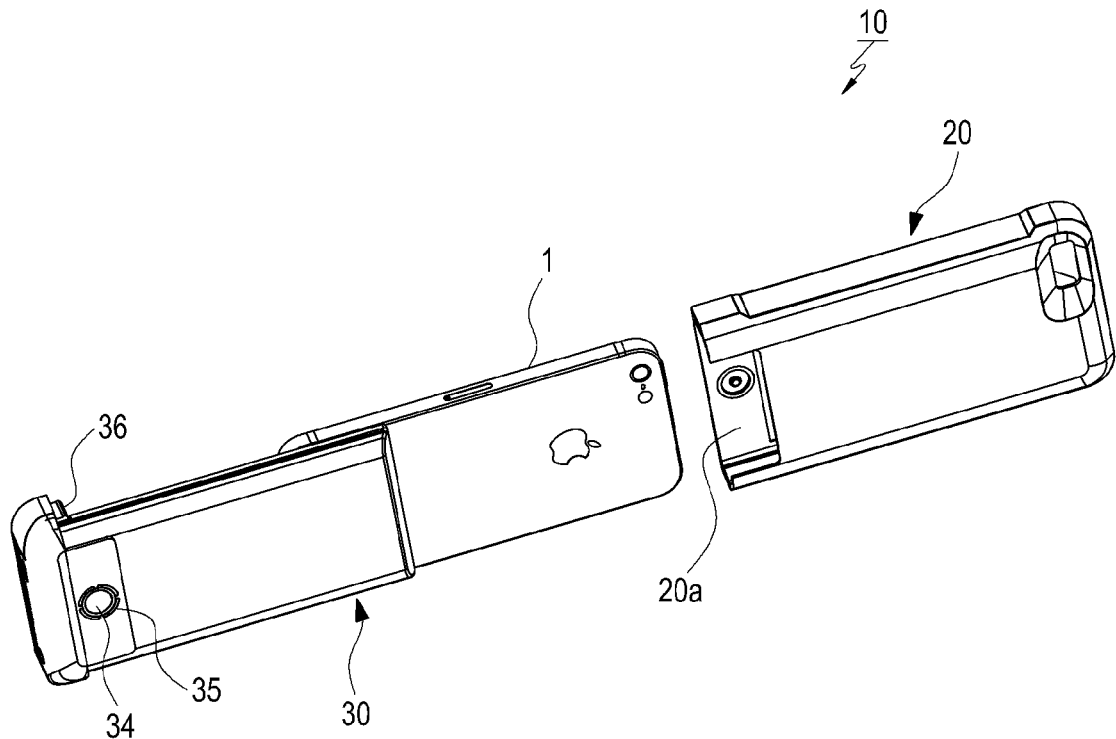
FIG. 3 is a perspective view showing a bottom surface of a protecting case in a before-coupling state according to the first embodiment of the present invention.

Referring to FIGS. 1 through 3, a structure of a protecting case 10 according to a first embodiment of the present invention will be described.

FIG. 1 is an exploded perspective view of the protecting case 10 according to the first embodiment of the present invention. FIG. 2 is a perspective view showing a before-coupling state of the protecting case 10 according to the first embodiment of the present invention. FIG. 3 is a perspective view showing a before-coupling state of the protecting case 10 and a bottom surface of the protecting case 10 according to the first embodiment of the present invention.

Referring to FIGS. 1 through 3, the protecting case 10 includes a protecting case body portion 20 and a sliding case portion 30 having an auxiliary battery cell 40 embedded therein. An opening 20a is formed in a lower portion of the protecting case body 20 to allow the sliding case portion 30 to be inserted/drawn out thereinto/therefrom. The protecting case body portion 20 is adapted to insert/draw and, at the same time, couple/separate the sliding case portion 30 thereinto/therefrom through the opening 20a by sliding movement. The sliding case portion 30 is electrically connected with the electronic device 1 and supplies power charged in the auxiliary battery cell 40 to the electronic device 1. The sliding case portion 30 is inserted/drawn into/out from the opening 20a by sliding movement.

Since the sliding case portion 30 is electrically connected with the electronic device 1, supplies power charged in the auxiliary battery cell 40 to the electronic device 1, and is mounted on or removed from the protecting case body portion 20 by being inserted/drawn into/out from the opening 20a by sliding movement, the use of the electronic device 1 is improved with easy power supply of the electronic device 1, coupling and separation of the electronic device 1 with respect to the protecting case 10 is facilitated, and protection of the electronic device 1, which is a function of a product, is further enhanced.

Herein, examples of the electronic device 1 according to the embodiments of the present invention may include not only mobile communication terminals operating according to communication protocols corresponding to various communication systems, but also any information communication apparatuses and multimedia apparatuses such as Portable Multimedia Players (PMPs), MP3 players, navigation systems, game consoles, notebooks, net-books, advertisement boards, televisions (TVs), digital broadcasting players, Personal Digital Assistants (PDAs), and smart phones, and so forth, and their application apparatuses.

As illustrated in FIG. 1, the protecting case body portion 20 includes a top case 21 and a bottom case 22, on an outer circumference of which is provided a flexible frame 23 for coupling the top case 21 and the bottom case 22 with each other and fixing them. The top case 21 includes an auxiliary button portion 21a that presses a button of the electronic device 1 when being pressed.

The top case 21 and the bottom case 22 may be formed of hard materials such as PolyCarbonate (PC). The flexible frame 23 may include one of rubber and Temperature PolyUrethane (TPU). In particular, the flexible frame 23 may use not only rubber and TPU, but also other types of urethane and silicon having flexibility.

The sliding case portion 30 will be more specifically described with reference to FIGS. 1 through 5 and FIG. 7. The sliding case portion 30 includes the auxiliary battery cell 40, a terminal through-hole 32, a Universal Serial Bus (USB) port 33, a power switch 34, and at least one charging lamps 35. The auxiliary battery cell 40 is provided in the sliding case portion 30 to couple a USB terminal 1b of the electronic device 1 to the USB port 33 and supply charging power to the electronic device 1 when the electronic device 1 is coupled to the sliding case portion 30. The terminal through-hole 32 is provided in the sliding case portion 30 to pass an external terminal 2 therethrough. The external terminal 2 may include an earphone jack or a headset jack of the electronic device 1. In the current embodiment, the external terminal 2 is assumed to be an earphone jack or a headset jack, for example, but the external terminal 2 is not limited thereto. That is, any other configuration passing through the terminal through-hole 32 may be used as an example of various modifications. The USB port 33 is provided in the sliding case portion 30 for electric connection with the USB terminal 1b provided in the electronic device 1 and an external USB terminal (not shown).

Figure 4:
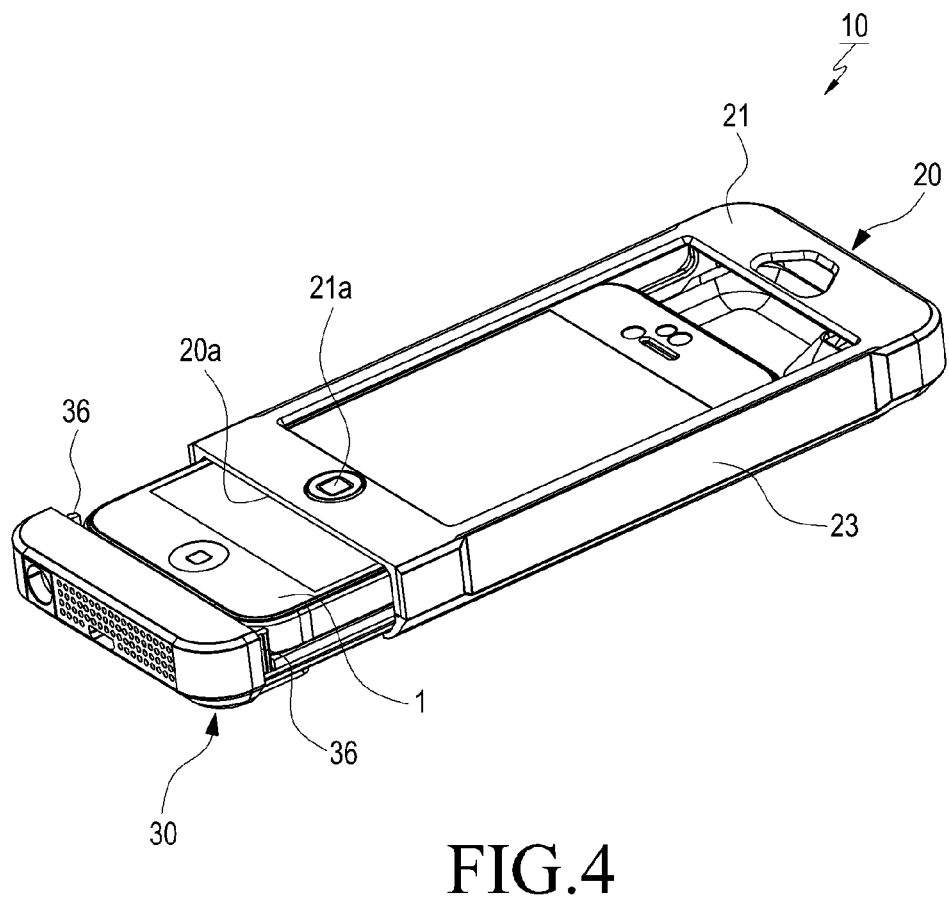
FIG. 4 is a perspective view showing a coupling process of a protecting case according to the first embodiment of the present invention.

As illustrated in FIGS. 3 and 4, the power switch 34 is provided in the sliding case portion 30 to operate the auxiliary battery cell 40 when being pressed. The charging lamps 35 are provided on an outer circumference of the power switch 34 to indicate remaining charging power and charging state of the auxiliary battery cell 40.

Herein, a charging method for the charging lamps 35 will be described in detail below.

Figure 8:
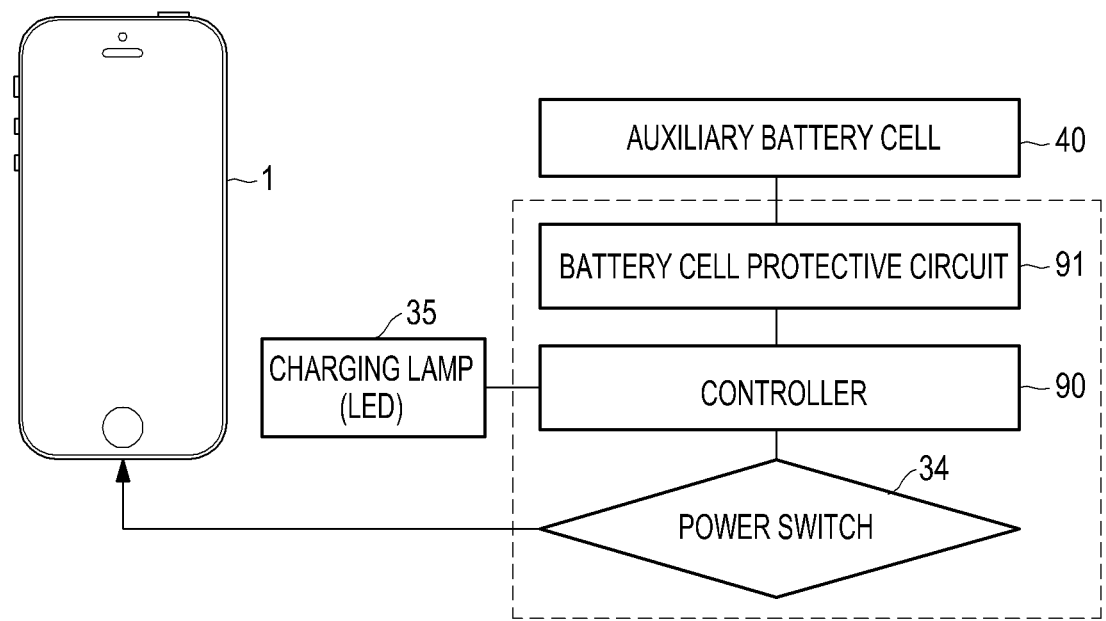
FIG. 8 is a circuit diagram for describing a charging method of a protecting case according to the first embodiment of the present invention.

FIG. 8 is a circuit diagram for describing a charging method for the protecting case 10 according to the first embodiment of the present invention.

As illustrated in FIG. 8, the charging lamps 35 may include Light Emitting Diodes (LEDs). The charging lamps 35 may also be other types of charging lamps capable of indicating the remaining charging power and charging state of the auxiliary battery cell 40 as well as LEDs. For example, the charging lamps 35 may include small bulbs and small lamps.

The power switch 34 has a shape of "O" and four charging lamps 35 are provided on the outer circumference of the power switch 34.

A battery cell protective circuit 91 prevents heat emission or explosion of the auxiliary battery cell 40 due to overcharging, over-discharging, and over-current. For example, if abnormal voltage or abnormal current is sensed, the battery cell protective circuit 91 may stop charging or discharging the auxiliary battery cell 40.

A controller 90 may sense mounting or separation of the auxiliary battery cell 40. The controller 90 may power on/off the sliding case portion 30 based on a signal input from the power switch 34. Controlling power-on/off of the sliding case portion 30 may be based on a duration of a signal received from the power switch 34. The controller 90 may control charging of a battery cell (not shown) and the auxiliary battery cell 40 provided in the electronic device 1 according to on/off states of the sliding case portion 30 when the auxiliary battery cell 40 is coupled.

For example, if a signal maintained for 3 seconds is input from the power switch 34 when the external charging terminal (not shown) and the USB port 33 of the sliding case portion 30 are electrically connected and the sliding case portion 30 is in a power-off (OFF) state, the controller 90 may power on the sliding case portion 30. The controller 90 then first charges the battery cell (not shown) provided in the electronic device 1 by using power input from the external charging terminal (not shown). Upon completion of charging of the battery cell (not shown) provided in the electronic device 1, the controller 90 charges the auxiliary battery cell 40 provided in the sliding case portion 30.

On the other hand, if a signal maintained for 3 seconds is input from the power switch 34 when the external charging terminal (not shown) in a power-on (ON) state of the sliding case portion 30, the controller 90 may power off the sliding case portion 30. The controller 90 charges the battery cell (not shown) provided in the electronic device 1 by using power input from the external charging terminal (not shown). In this case, the battery cell 40 provided in the sliding case portion 30 is not charged.

The controller 90 may control light-emission of the charging lamps 35 according to charging and discharging states. Control of light-emission of the charging lamps 35 may be based on a duration of a signal received from the power switch 34.

For example, if a signal maintained for a short time (for example, of more than 1 second and less than 3 seconds) is input from the power switch 34, the controller 90 controls light-emission of the charging lamps 35 to indicate the remaining capacity of the auxiliary battery cell 40.

That is, if the power switch 34 is pressed long (for example, for 3 seconds or more), the sliding case portion 30 is powered on/off; if the power switch 34 is pressed short (for example, for 1 second or more to 3 seconds or less), then the remaining charging capacity of the auxiliary battery cell 40 is indicated. If the user presses the power switch 34 long, the sliding case portion 30 is powered on; if the user presses the power switch 34 long again, the sliding case portion 30 is powered off.

Thus, when the external charging terminal (not shown) is electrically connected to the USB port 33 of the sliding case portion 30, if the power switch 34 is pressed long again to power off the sliding case portion 30, then the power of the external charging terminal (not shown) charges only the battery cell (not shown) provided in the electronic device 1. Then, if the power switch 34 is pressed long to power on the sliding case portion 30, then the power of the external charging terminal (not shown) charges the battery cell (not shown) provided in the electronic device 1 and then charges the auxiliary battery cell 40 provided in the sliding case portion 30.

Figure 9A:
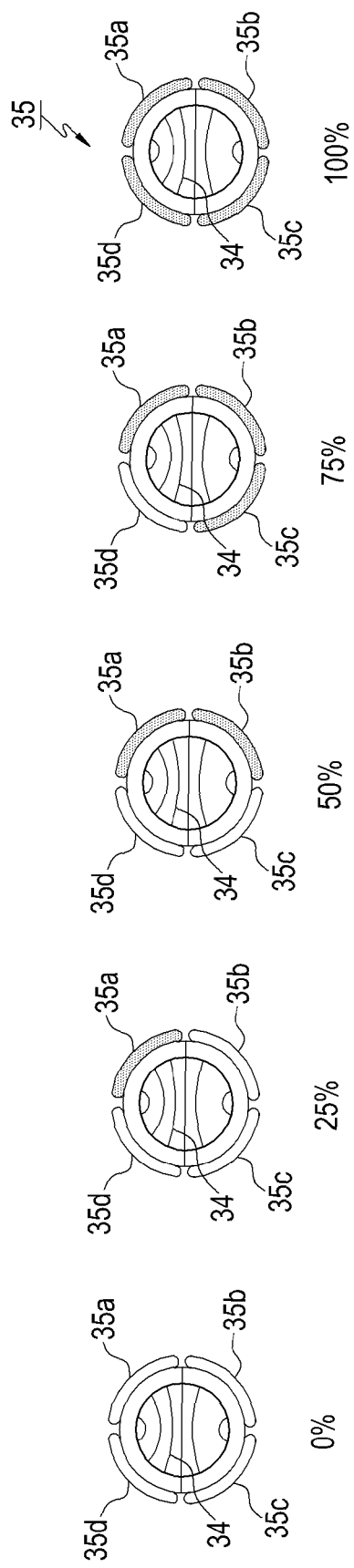
FIG. 9A is a diagram showing a charging process of a charging lamp of a protecting case according to the first embodiment of the present invention.
Figure 9B:
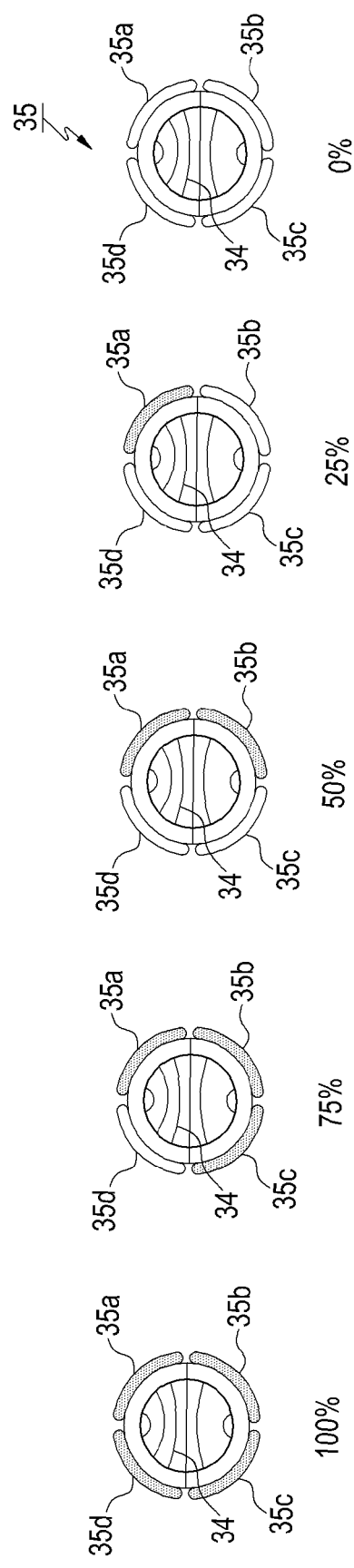
FIG. 9B is a diagram showing a use state of a charging lamp of a protecting case according to the first embodiment of the present invention.
Figure 10:
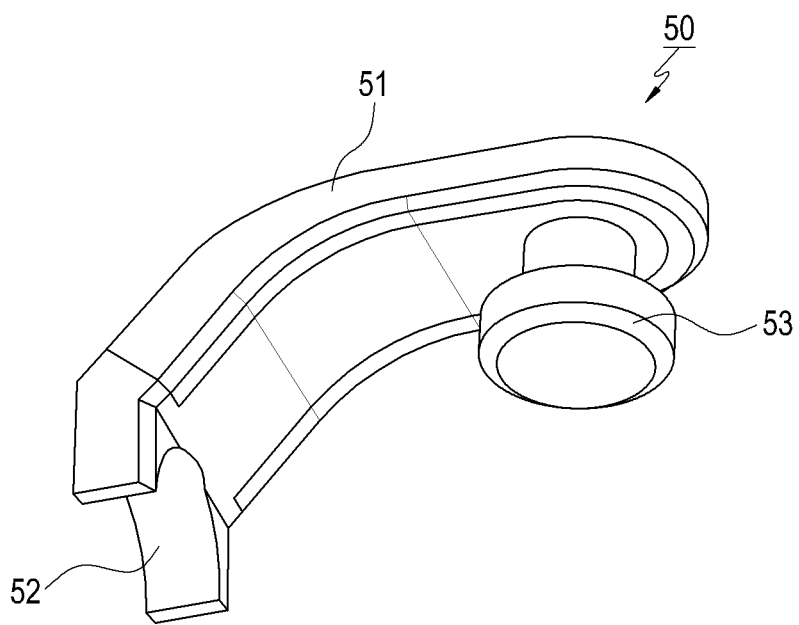
FIG. 10 is perspective view of a terminal cover portion of a protecting case according to the first embodiment of the present invention.
Figure 11A:
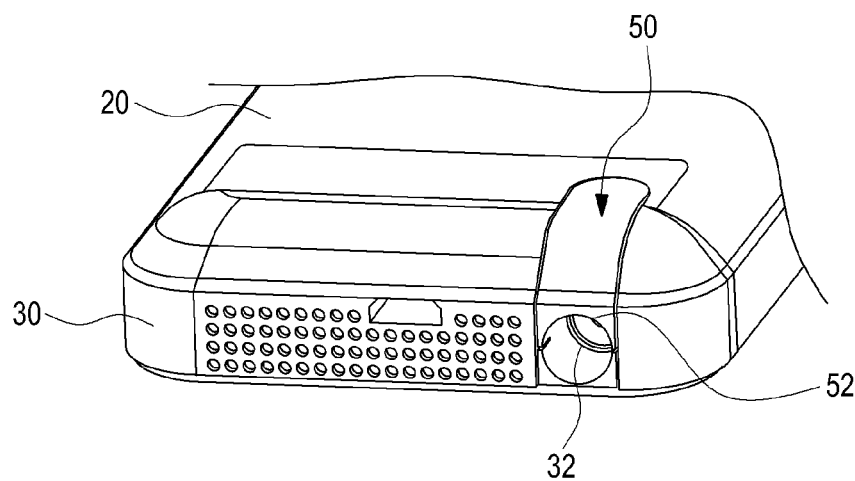
FIG. 11A is a perspective view showing a before-operation state of a terminal cover portion of a protecting case according to the first embodiment of the present invention.
Figure 11B:
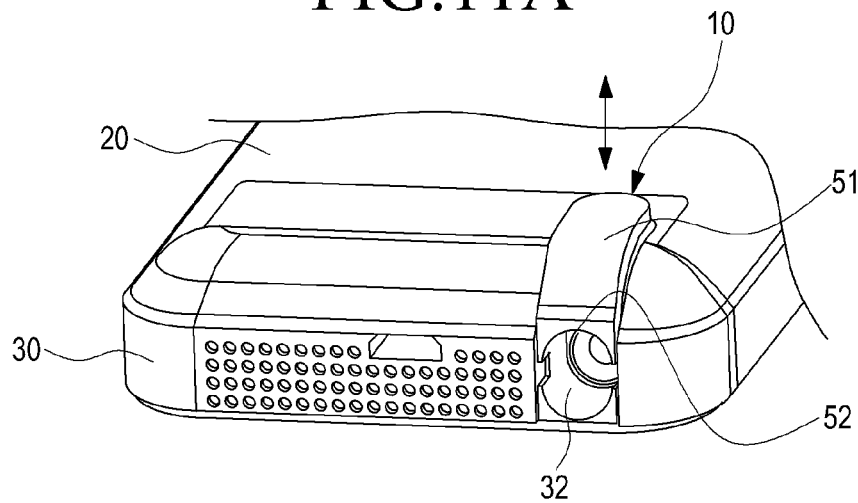
FIG. 11B is a perspective view showing a pulled-state of a terminal cover portion of a protecting case according to the first embodiment of the present invention.
Figure 11C:
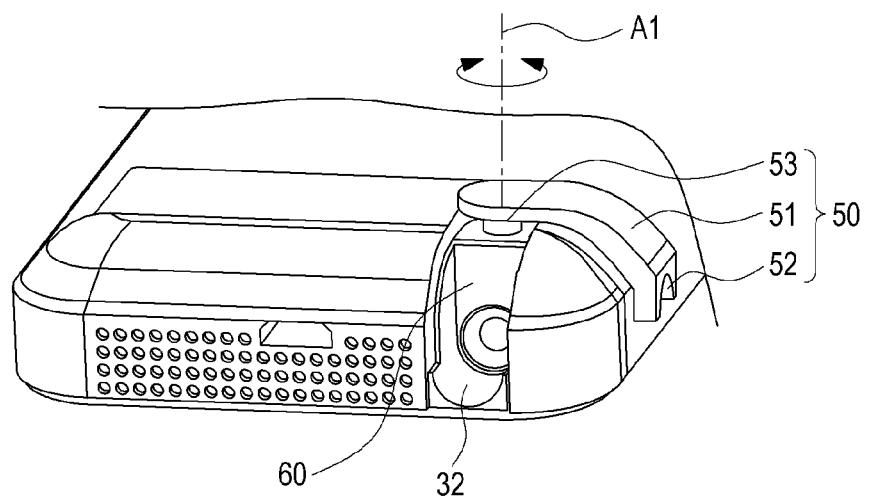
FIG. 11C is a perspective view showing a rotated-state of a terminal cover portion of a protecting case according to the first embodiment of the present invention.

To describe the charging and use states indicated by the charging lamps 35, FIGS. 9A and 9B will be referred to, which are diagram showing a charging process of the charging lamps 35 of the protecting case 10 according to the first embodiment of the present invention and a diagram showing the use state of the charging lamps 35 of the protecting case 10 according to the first embodiment of the present invention, respectively.

As illustrated in FIG. 9A, four charging lamps 35a, 35b, 35c, and 35d sequentially emit light in a clockwise direction to indicate a charging state. That is, if the charging state of the auxiliary battery cell 40 is 0%, the charging lamps 35 do not emit light. If the charging state of the auxiliary battery cell 40 is 25%, the first charging lamp 35a emits light and the other charging lamps emit light in the clockwise direction. If the charging states of the auxiliary battery cell 40 are 50% and 75%, respectively, the second charging lamp 35b emits light and then the third charging lamp 35c emits light. If the charging state of the auxiliary battery cell 40 is 100%, the fourth charging lamp 35d emits light and at the same time, all the four charging lamps 35a, 35b, 35c, and 35d emit light. Thus, it may be indicated that charging of the auxiliary battery cell 40 is completed.

The controller 90 may control power supply from the auxiliary battery cell 40 to the electronic device 1. The electronic device 1 may execute various functions by using the power supplied from the auxiliary battery cell 40.

Meanwhile, as illustrated in FIG. 9b, when all of the four first, second, third, and fourth charging lamps 35a, 35b, 35c, and 35d emit light, they are extinguished in the counterclockwise direction according to discharging of the auxiliary battery cell 40.

More specifically, if the remaining battery capacity of the auxiliary battery cell 40 is 75%, the fourth charging lamp 35*d* is extinguished; if the remaining battery capacities of the auxiliary battery cell 40 are 50% and 25%, respectively, the second charging lamp 35*b* and the third charging lamp 35*c* are sequentially extinguished. If the remaining charging capacity of the auxiliary battery cell 40 is 0%, the first charging lamp 35*a* is extinguished, such that all of the charging lamps 35*a*, 35*b*, 35*c*, and 35*d* are extinguished. If the remaining charging capacity is less than a predetermined level, for example, 10%, then the controller 90 may control all of the charging lamps 35*a*, 35*b*, 35*c*, and 35*d* to blink on and off, thus indicating that re-charging is required.

Control of light emission of the charging lamps 35 described above with reference to FIGS. 9A and 9B may be performed by the controller 90.

Figure 5:
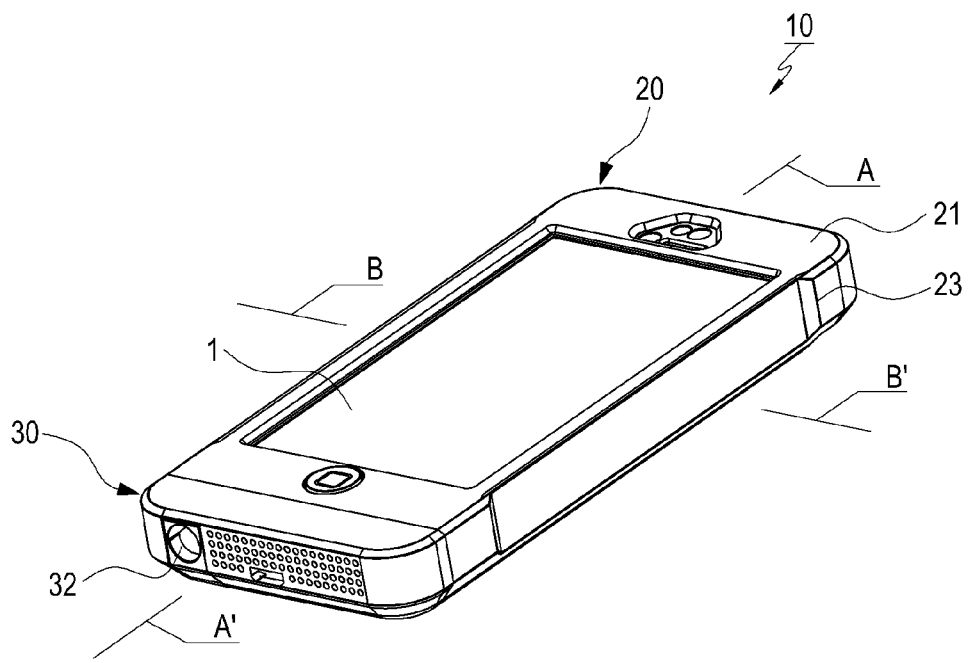
FIG. 5 is a perspective view showing a coupling state of a protecting case according to the first embodiment of the present invention.

As illustrated in FIGS. 4 and 5 referred to above, the sliding case portion 30 may include a pair of locker portions 36 for coupling/separation of the protecting case body portion 20 to/from the opening 20*a* and fixing of the protecting case body portion 20. The terminal through-hole 32 may include a terminal jack hole for through-coupling with the external terminal 2, such as an earphone jack or a headset jack.

The terminal through-hole 32 includes a terminal cover portion 50 which is pulled and is rotated along a hinge axis A1 to open and close the terminal through-hole 32.

To describe the terminal cover portion 50 in more detail, FIG. 10 and FIGS. 11A through 11C will be referred to, which are a perspective view of the terminal cover portion 50 of the protecting case 10 according to the first embodiment of the present invention, a perspective view showing a state before the terminal cover portion 50 of the protecting case 10 according to the first embodiment of the present invention operates, a perspective view showing a state in which the terminal cover portion 50 of the protecting case 10 according to the first embodiment of the present invention is pulled, and a perspective view showing a state in which the terminal cover portion 50 of the protecting case 10 according to the first embodiment of the present invention is pulled, rotated, and thus opened or closed, respectively.

As illustrated in FIG. 10 and FIGS. 11A through 11C, the terminal cover portion 50 includes a cover body portion 51, a semispherical opening portion 52, and a hinge portion 53. The cover body portion 51 is in a curved shape to be included in the terminal through-hole 32 of the sliding case portion 30. The semispherical opening portion 52 is formed in an end of the cover body portion 51 to be coupled to an inlet of the terminal through-hole 32. The hinge portion 53 is provided in the other end of the cover body portion 51 to provide the hinge axis A1 and rotate the terminal cover portion 50, thus opening and closing the terminal through-hole 32 with a tool.

The opening portion 52 and the bottom surface of the cover body portion 51 may be formed of one of rubber and Temperature PolyUrethane (TPU). In particular, the opening portion 52 and the bottom surface of the cover body portion 51 may also use other types of urethane and silicon having flexibility as well as rubber and TPU.

The terminal through-hole 32 includes a guide portion 60 for guidance in coupling and separation of the external terminal 2.

Herein, the operating process of the protecting case 10 according to the first embodiment will be described in more detail.

As in FIGS. 1 through 3 described above, the electronic device 1 is coupled to the sliding case portion 30 having the auxiliary battery cell 40 embedded therein. In this case, an USB terminal hole 1*a* of the electronic device 1 is coupled and electrically connected to the USB port 33 provided in the sliding case portion 30. In this state, the sliding case portion 30 is inserted into the opening 20*a* formed in the lower portion of the protecting case body portion 20 and at the same time, is slid to be coupled into the protecting case body portion 20.

Since the sliding case portion 30 includes the pair of locker portions 36 as illustrated in FIG. 4, the sliding case portion 30 is inserted into the protecting case body portion 20 and then is slid, and in a sliding end position, the pair of locker portions 36 are coupled to the opening 20*a* of the protecting case body portion 20 to fix the protecting case body portion 20.

Figure 6:
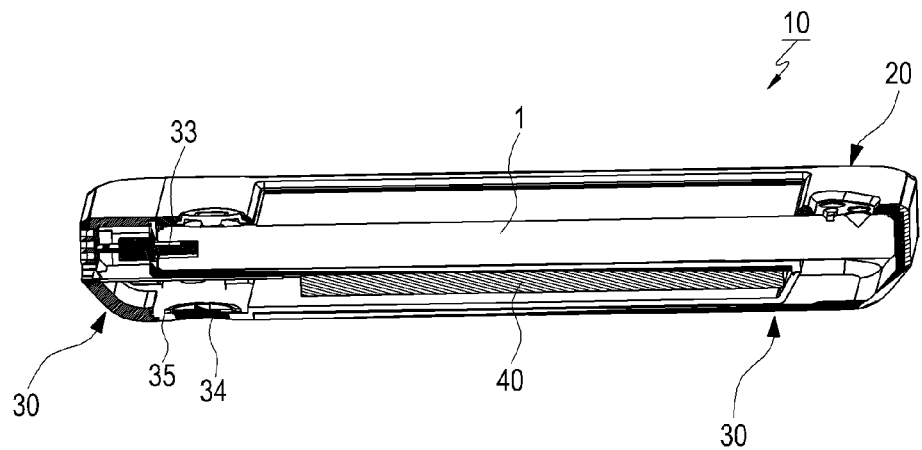
FIG. 6 is a cross-sectional view cut along a line A-A' of FIG. 5.
Figure 7:
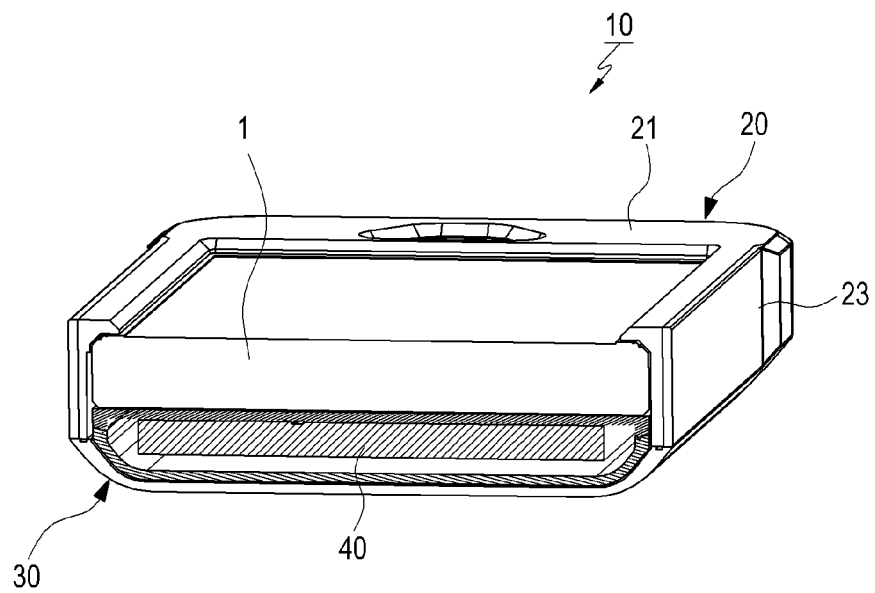
FIG. 7 is a cross-sectional view cut along a line B-B' of FIG. 5.

In this state, as illustrated in FIGS. 5 through 7, the external charging terminal (not shown) is electrically connected to the USB port 33 provided in the sliding case portion 30, and the power switch 34 of the sliding case portion 30 is pressed long for 3 seconds to power on the sliding case portion 30. In this case, the power of the external charging terminal (not shown) charges a battery cell (not shown) provided in the electronic device 1 and then charges the auxiliary battery cell 40 embedded in the protecting case 10.

The charging state of the auxiliary battery cell 40 is indicated in the at least one charging lamps 35 provided on the outer circumference of the power switch 34. The operation of the charging lamps 35 has already been mentioned above and thus will not be described at this time.

If charging of the battery cell (not shown) of the electronic device 1 and charging of the auxiliary battery cell 40 of the protecting case 10 are completed in this way, the external charging terminal (not shown) is separated from the USB port 33 of the sliding case portion 30.

The user uses the electronic device 1 provided in the protecting case 10 while carrying the electronic device 1. In this case, to connect the earphone jack 2 or the headset jack to the electronic device 1, the user pulls the terminal cover portion 50 formed in the sliding case portion 30 and rotates the terminal cover portion 50 along the hinge axis A1 to open the terminal through-hole 30 of the sliding case portion 30.

Figure 12A:
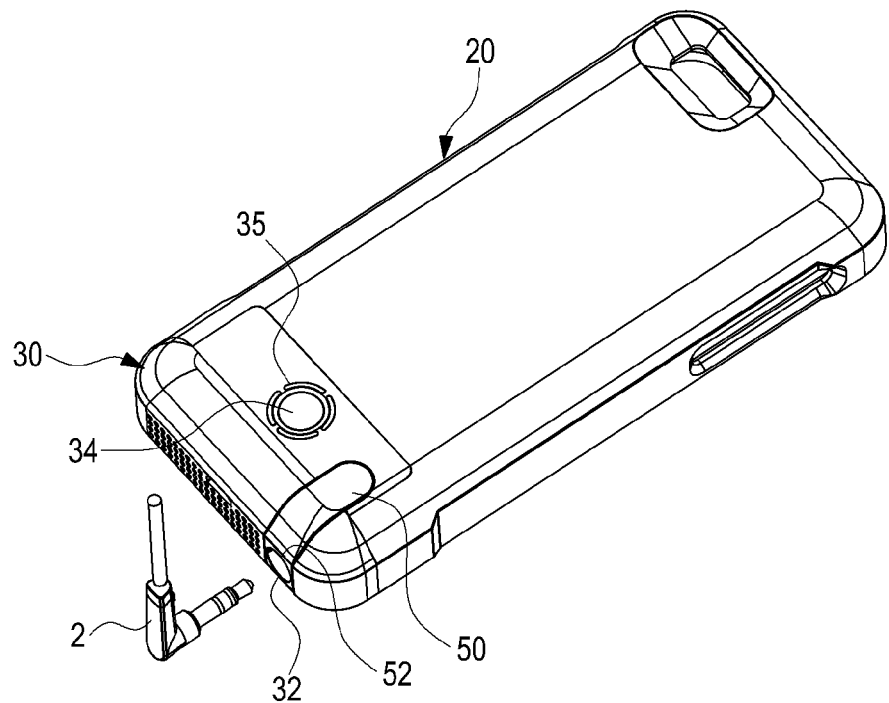
FIG. 12A is a perspective view of a before-opened state of a terminal cover portion of a protecting case according to the first embodiment of the present invention.
Figure 12B:
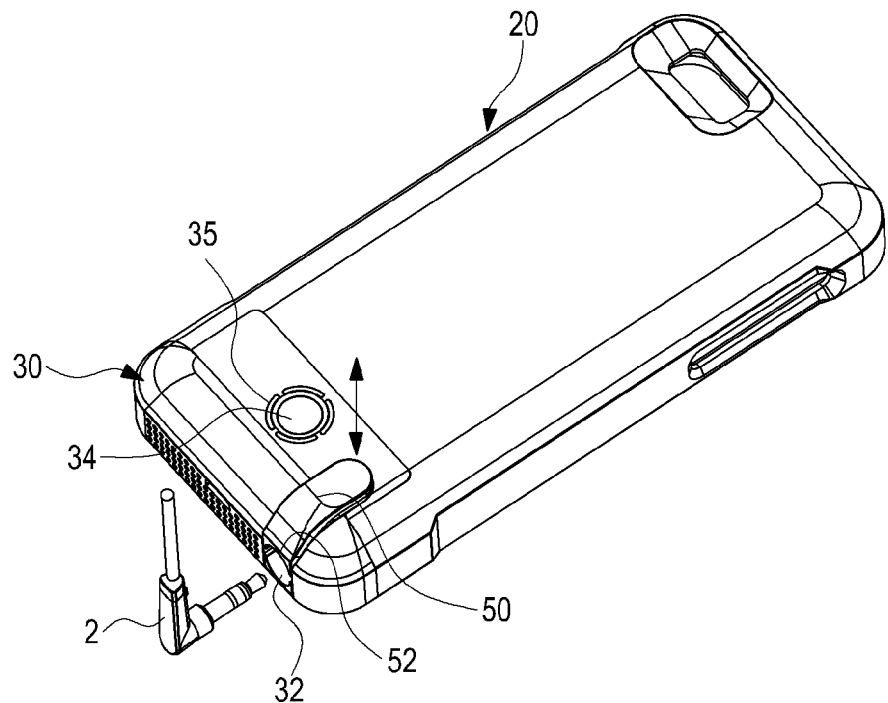
FIG. 12B is a perspective view showing an opening/closing process of a terminal cover portion of a protecting case according to the first embodiment of the present invention.
Figure 12C:
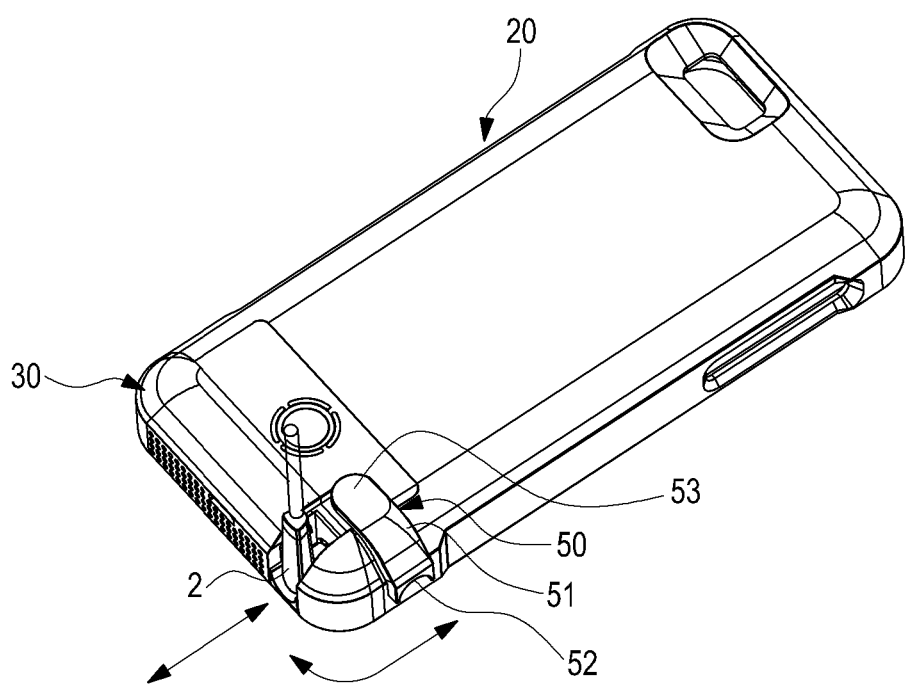
FIG. 12C is a perspective view showing a state in which an external terminal is coupled after opening/closing of a terminal cover portion of a protecting case according to the first embodiment of the present invention.

That is, as illustrated in FIGS. 12A and 12B, the user holds, pulls and lifts up the semispherical opening portion 52 formed in one end of the terminal cover portion 50, and then as illustrated in FIG. 12C, the user rotates the semispherical opening portion 52 in a side direction by using the hinge portion 53 formed in the other end of the terminal cover portion 50. The user inserts the earphone jack 2 into the terminal through-hole 32. The earphone jack 2 is guided along the guide portion 60 formed in the terminal through-hole 32 and passes through the terminal through-hole 32 to be electrically connected to the terminal hole 1*a* of the electronic device 1.

In this state, the user may listen to voice or music provided in a call and various sounds provided in a moving image through an earphone connected with the electronic device 1.

In the ON state of the power switch 34 of the sliding case portion 30, the power of the auxiliary battery cell 40 is first used and then the power of the battery cell (not shown) provided in the electronic device 1 is used.

That is, if the power of the auxiliary battery cell 40 is used up, the power of the battery cell (not shown) provided in the electronic device 1 is directly supplied to continuously execute a plurality of functions such as Internet or games. Thus, the power supply of the electronic device 1 may be made easy and the use of the electronic device 1 may be improved.

In this case, as illustrated in FIGS. 12A, 12B, and 12C, if the earphone is not used, the earphone jack 2 is separated from the terminal through-hole 32 and then the terminal cover portion 50 is rotated in the reverse direction, after which the earphone jack 2 is pushed for insertion into the terminal through-hole 32 and thus returns to its original position.

Herein, the power switch 34 of the sliding case portion 30 is switched off (OFF) and in this state, the external charging terminal (not shown) is electrically connected to the USB port 33 of the sliding case portion 30, such that the battery cell (not shown) provided in the electronic device 1 is first charged.

Figure 13:
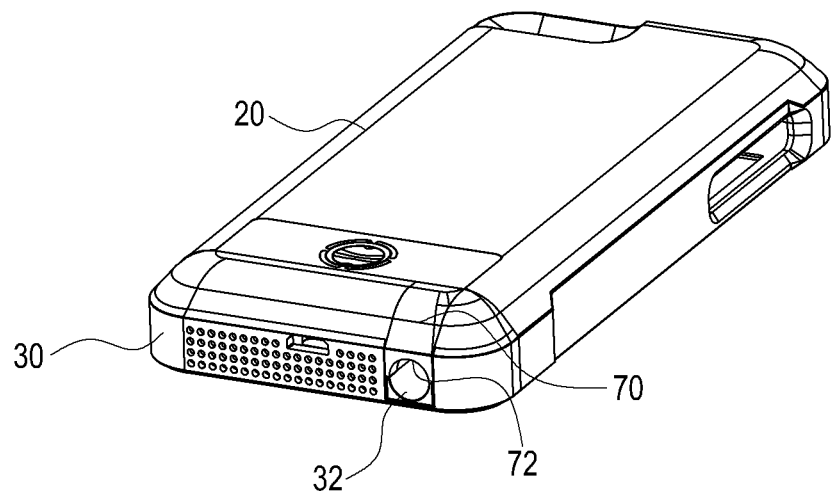
FIG. 13 is a perspective view of another embodiment of a terminal cover portion of a protecting case according to the first embodiment of the present invention.
Figure 14:
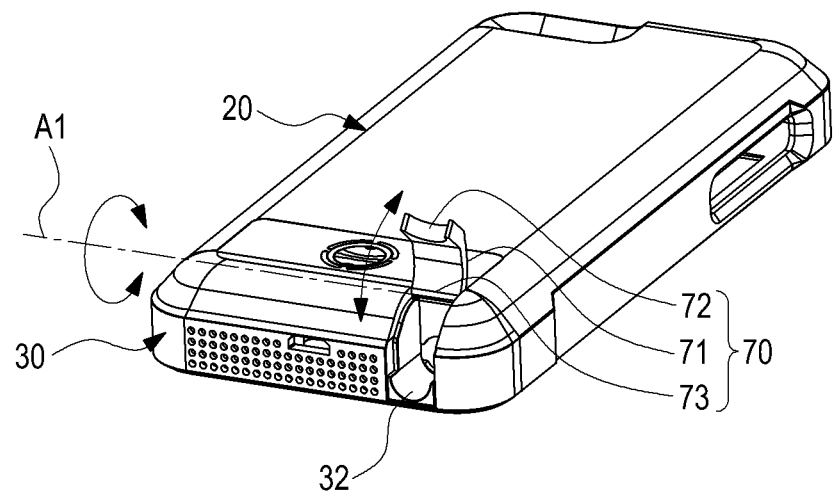
FIG. 14 is a perspective view showing an opened/closed state of a terminal cover portion of FIG. 13.

FIGS. 13 and 14 show another embodiment of the terminal cover portion 50. FIG. 13 is a perspective view of a terminal cover portion 70, and FIG. 14 is a perspective view showing an operating state of the terminal cover portion 70 of FIG. 13.

The terminal cover portion 70 includes a cover body portion 71, a semispherical opening portion 72, and a hinge portion 73. The cover body portion 71 is formed in a curved shape to be included in the terminal through-hole 32 of the sliding case portion 30. The semispherical opening portion 72 is formed in one end of the cover body portion 71 to be coupled to an inlet of the terminal through-hole 32. The hinge portion 73 is provided in the other end of the cover body portion 71 to provide the hinge axis A1 and rotate the terminal cover portion 70 upwardly and downwardly, thus opening and closing the terminal through-hole 32 with a tool.

That is, as illustrated in FIG. 13, the terminal cover portion 70 is coupled to the terminal through-hole 32 in a way to rotate by using the hinge portion 73. The terminal cover portion 70 is formed in a curved shape along the shape of the exterior of the sliding case portion 30, such that once the terminal cover portion 70 is coupled to the terminal through-hole 32, the terminal cover portion 70 is coupled to fit for the shape of the exterior of the sliding case portion 30 and at the same time, closes the terminal through-hole 32.

In this state, as illustrated in FIG. 14, to open the terminal through-hole 32, if the semispherical opening portion 72 formed in one end of the terminal cover portion 70 is held and lifted up, then the terminal cover portion 70 is rotated upwardly along the hinge axis A1 of the hinge portion 73, thus opening the terminal through-hole 32.

The external terminal 2, for example, the earphone jack or the headset jack, is inserted into and passes through the opened terminal through-hole 32, thus being electrically connected to the terminal hole 1a of the electronic device 1 for use.

The terminal cover portion 70 is rotated downwardly in the reverse direction to return to the original position, thus closing the terminal through-hole 32.

Figure 15:
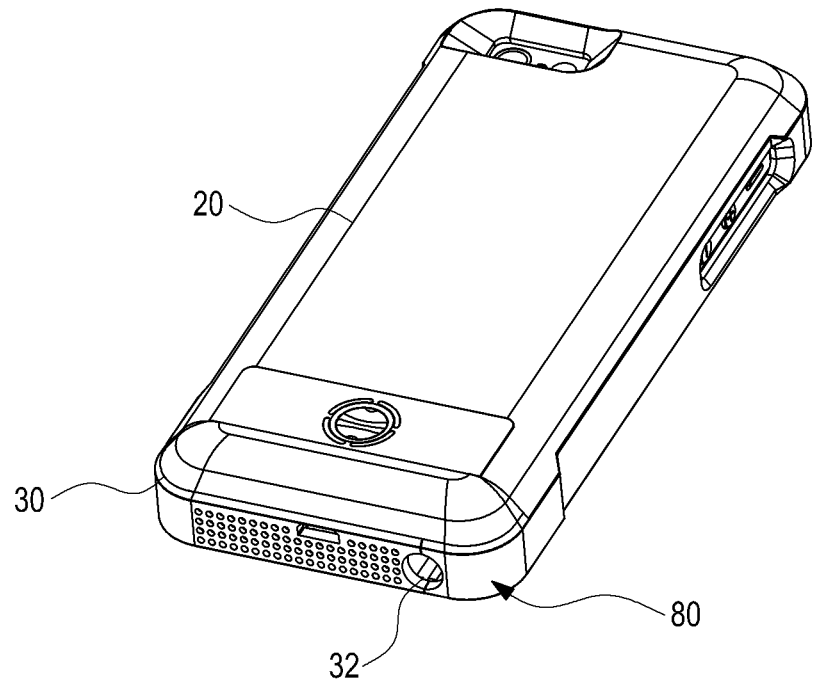
FIG. 15 is a perspective view showing still another embodiment of a terminal cover portion of a protecting case according to the first embodiment of the present invention.
Figure 16:
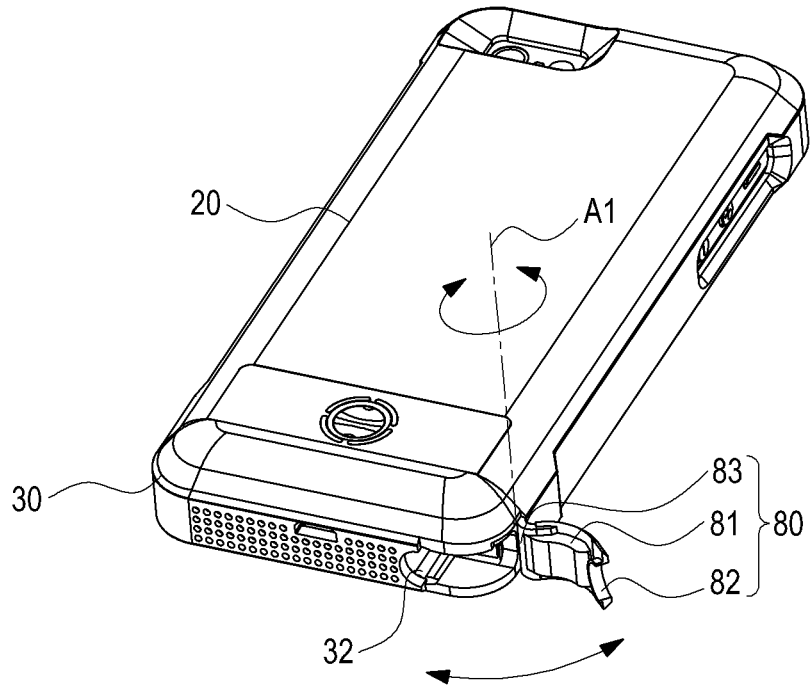
FIG. 16 is a perspective view showing an opened/closed state of a terminal cover portion of FIG. 15.

FIGS. 15 and 16 illustrate still another embodiment of the terminal cover portion 50. FIG. 15 is a perspective view of a terminal cover portion 80 and FIG. 16 is a perspective view showing an operating state of the terminal cover portion 80 illustrated in FIG. 15.

The terminal cover portion 80 includes a cover body portion 81, a semispherical opening portion 82, and a hinge portion 83. The cover body portion 81 is formed in a curved shape to be included in the terminal through-hole 32 of the sliding case portion 30. The semispherical opening portion 82 is formed in one end of the cover body portion 81 to be coupled to the inlet of the terminal through-hole 32. The hinge portion 83 is formed in the other end of the cover body portion 81 to provide the hinge axis A1 and rotate the terminal cover portion 50 to the left and to the right, thus opening and closing the terminal through-hole 32 with a tool.

That is, as illustrated in FIG. 15, the terminal cover portion 80 is coupled to the terminal through-hole 32 in a way to rotate to the left and to the right by using the hinge portion 83. The terminal cover portion 80 is formed in a curved shape along the shape of the exterior of the sliding case portion 30, such that if the terminal cover portion 80 is coupled to the terminal through-hole 32, the cover portion 80 is coupled to fit for the shape of the exterior of the sliding case portion 30 and at the same time, closes the terminal through-hole 32.

In this state, as illustrated in FIG. 16, to open the terminal through-hole 32, the semispherical opening portion 82 formed in one end of the terminal cover portion 80 is held and rotated from the left to the right. Then, the terminal cover portion 80 is rotated along the hinge axis A1 of the hinge portion 83, thus opening the terminal through-hole 32.

The external terminal 2, such as the earphone jack or the headset jack, is inserted into and passes through the opened terminal through-hole 32 to be electrically connected to the terminal hole 1a of the electronic device 1 for use.

Then, the terminal cover portion 80 is rotated in the reverse direction from the right to the left to return to the original position, thus closing the terminal through-hole 32.

Hereinbelow, a protecting case for protecting the electronic device 1 according to a second embodiment of the present invention will be described with reference to the accompanying drawings.

The structure of the protecting case according to the second embodiment of the present invention will be described with reference to FIGS. 17 and 18.

Figure 17:
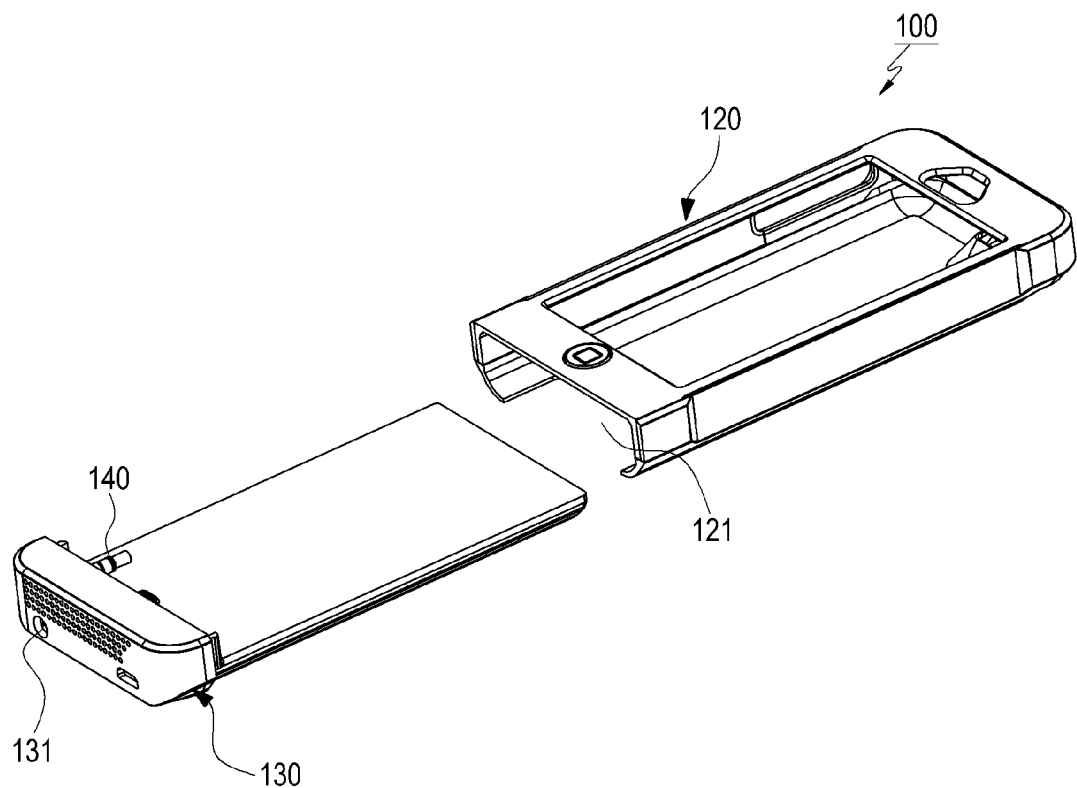
FIG. 17 is an exploded perspective view of a protecting case according to a second embodiment of the present invention.
Figure 18:
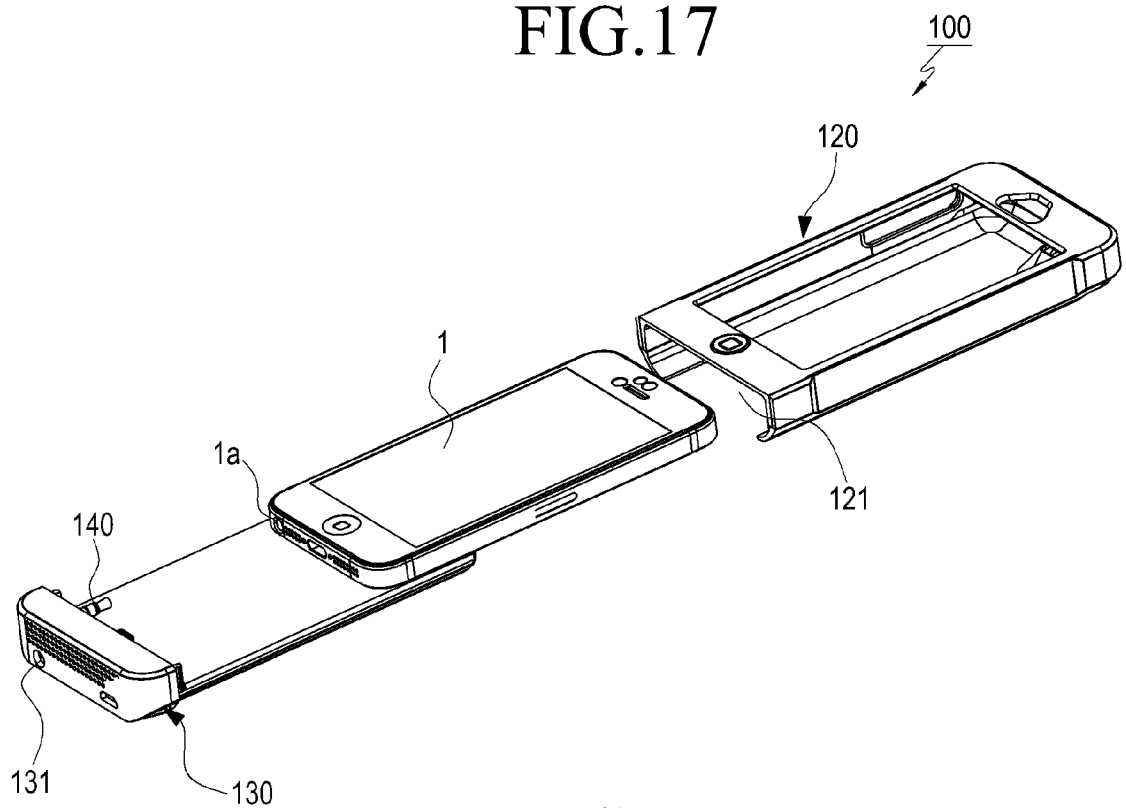
FIG. 18 is an exploded perspective view showing a use state of a protecting case according to the second embodiment of the present invention.

FIG. 17 is an exploded perspective view of a protecting case 100 according to the second embodiment of the present invention, and FIG. 18 is a before-coupling perspective view of the protecting case 100 according to the second embodiment of the present invention.

Referring to FIGS. 17 and 18, the protecting case 100 includes a protecting case body portion 120 and a sliding case portion 130 having an auxiliary battery cell (not shown) embedded therein. An opening 121 is formed in a lower portion of the protecting case body portion 120 to allow the sliding case portion 130 to be inserted/drawn out thereinto/therefrom. The protecting case body portion 120 is adapted to insert/draw and, at the same time, couple/separate the sliding case portion 130 thereinto/therefrom through the opening 121 by sliding movement. The sliding case portion 130 is electrically connected with the electronic device 1 and supplies power charged in the auxiliary battery cell 40 to the electronic device 1. The sliding case portion 130 is inserted/drawn into/out from the opening 121 by sliding movement.

As illustrated in FIG. 18, the sliding case portion 130 includes a connection terminal 140 that is electrically connected to the terminal hole 1a provided in the electronic device 1. The connection terminal 140 may include a connecting jack. The sliding case portion 130 includes an external terminal hole 131 for electric connection according to insertion of an external terminal (not shown).

The external terminal (not shown) may include the earphone jack or the headset jack of the electronic device 1. In the current embodiment of the present invention, the external terminal uses the earphone jack or the headset jack of the electronic device 1, but the external terminal is not limited thereto. That is, any other configuration electrically coupled to the external terminal hole 131 may be used as an example of various modifications.

As illustrated in FIG. 18, when the electronic device 1 is coupled to the sliding case portion 130, the terminal hole 1a of the electronic device 1 is coupled to, and at the same time, electrically connected to the connection terminal 140 formed in the sliding case portion 130. In this state, the sliding case portion 130 is inserted into the opening 121 formed in the lower portion of the protecting case body portion 120 for coupling.

An earphone jack (not shown), which is the external terminal, is inserted into the external terminal hole 131 of the sliding case portion 130 for coupling and electric connection, and the earphone jack is electrically connected with the electronic device 1 through the connection terminal 140 of the sliding case portion 130.

In this case, the user may listen to voice or music provided in a call mode and various sounds provided in moving images by using an earphone connected with the electronic device 1.

Herein, the detailed structures and operations of the protecting case body portion 120 and the sliding case portion 130 have already been described above in the first embodiment of the present invention and thus will not be described at this time.

That is, an auxiliary battery cell, a USB port, a power switch, at least one charging lamps, a pair of locker portions, a battery cell protective circuit, and a controller of the sliding case portion 130 are identical to those of the first embodiment of the present invention, and thus a description thereof will not be provided.

As such, a conventional protecting case (not shown) does not additionally include the rechargeable battery cell 40, such that when the electronic device uses up both the power of the basic battery pack and the power of the preliminary battery pack, recharging is required or another preliminary battery pack should be mounted on the electronic device 1. Moreover, due to the limited battery capacity, inconvenience often occurs during execution of various functions.

Therefore, the first and second embodiments of the present invention provide the sliding case portion (30 and 130 shown in FIGS. 1 and 17, respectively) having the auxiliary battery cell (40 shown in FIGS. 6 and 7) inserted into/drawn out from the protecting case (10 and 100 shown in FIGS. 1 and 17) by sliding movement, thereby directly supplying power necessary for the electronic device (1 shown in FIG. 1) and facilitating coupling and separation of the electronic device 1 to and from the protecting case.

It will be apparent to those of ordinary skill in the art that the protecting case according to the present invention described above is not limited to the disclosed embodiments and the accompanying drawings, and various substitutions, modifications, and changes within the technical scope of the present invention are possible.

What is claimed is:

1. A protecting case comprising:
   a protecting case body portion;
   a sliding case portion comprising an auxiliary battery cell, the sliding case portion being electrically connected with an electronic device, supplying power to the electronic device, and being inserted into/drawn out from the protecting case body portion by sliding movement;
   an input configured to receive power from an external power source;
   a switch configured to control charging of the auxiliary battery cell in response to the input being electrically connected to the external power source; and
   a controller configured to determine whether to use power received from the external power source to charge the auxiliary battery cell or to directly charge a battery cell of the electronic device without charging the auxiliary battery cell according to on/off states of the switch, wherein
   the controller senses physical mounting or separation of the auxiliary battery cell.

2. The protecting case of claim 1, wherein the sliding case portion further comprises a terminal through-portion that passes an external terminal therethrough for electric connection of the external terminal with the electronic device.

3. A protecting case comprising:
   a protecting case body portion comprising an opening disposed in a lower portion thereof;
   a sliding case portion comprising an auxiliary battery cell, the sliding case portion being electrically connected with the electronic device, supplying power to the electronic device, and being inserted into/drawn out from the opening by sliding movement;
   an input configured to receive power from an external power source;
   a switch configured to control charging of the auxiliary battery cell when the input is electrically connected to the external power source; and
   a controller configured to determine whether to use power received from the external power source to charge the auxiliary battery cell or to directly charge a battery cell of the electronic device without charging the auxiliary battery cell according to on/off states of the switch, wherein
   the controller senses physical mounting or separation of the auxiliary battery cell.

4. The protecting case of claim 3, wherein the protecting case body portion comprises a top case and a bottom case, and an outer circumference of the top case and the bottom case comprises a flexible frame.

5. The protecting case of claim 3, wherein the flexible frame comprises one of rubber and Temperature PolyUrethane (TPU).

6. The protecting case of claim 3, wherein the sliding case portion comprises:
   the auxiliary battery cell;
   a terminal through-hole to pass an external terminal therethrough;
   a Universal Serial Bus (USB) port;
   a power switch; and
   a charging lamp disposed on an outer circumference of the power switch to indicate remaining charging capacity and charging state of the auxiliary battery cell.

7. The protecting case of claim 3, wherein the sliding case portion further comprises a pair of locker portions that are coupled to and separated from the opening of the protecting case body portion and fix the protecting case body portion.

8. The protecting case of claim 6, wherein the terminal through-hole comprises a terminal jack hole.

9. The protecting case of claim 6, wherein the terminal through-hole further comprises a terminal cover portion that is pulled and rotated along a hinge axis to open or close the terminal through-hole with a tool.

10. The protecting case of claim 9, wherein the terminal cover portion comprises:
    a cover body portion;
    a semispherical opening portion disposed in one end of the cover body portion; and
    a hinge portion that is disposed in an opposite end of the one end of the cover body portion, provides the hinge axis, and allows rotation of the terminal cover portion.

11. The protecting case of claim 10, wherein the opening portion and a bottom surface of the cover body portion are formed of one of rubber and TPU.

12. The protecting case of claim 6, wherein the terminal through-hole further comprises a guide portion for guidance in coupling and separation of the external terminal.

13. The protecting case of claim 6, wherein the sliding case portion further comprises a battery cell protective circuit for preventing heat emission or explosion of the auxiliary battery cell due to over-charging, over-discharging, and over-current, and the controller powers on/off the sliding case portion based on a length of a signal received from the power switch and controls light emission of the charging lamps according to charging and discharging states.

14. The protecting case of claim 9, wherein the terminal cover portion comprises:
a cover body portion;
a semispherical opening portion disposed in one end of the cover body portion; and
a hinge portion that is disposed in an opposite end of the one end of the cover body portion, provides the hinge axis, and allows upward and downward rotation of the terminal cover portion.

15. The protecting case of claim 9, wherein the terminal cover portion comprises:
a cover body portion;
a semispherical opening portion formed in one end of the cover body portion; and
a hinge portion that is formed in an opposite end of the one end of the cover body portion, provides the hinge axis, and allows leftward and rightward rotation of the terminal cover portion.

16. A protecting case comprising:
a protecting case body portion comprising an opening disposed in a lower portion thereof;
a sliding case portion comprising an auxiliary battery cell and a connection terminal electrically connected with an electronic device, the sliding case portion supplying power to the electronic device, and being inserted into/drawn out from the opening by sliding movement;
an input configured to receive power from an external power source;
a switch configured to control charging of the auxiliary battery cell in response to the input being electrically connected to the external power source; and
a controller configured to determine whether to use power received from the external power source to charge the auxiliary battery cell or to directly charge a battery cell of the electronic device without charging the auxiliary battery cell according to on/off states of the switch, wherein
the controller senses physical mounting or separation of the auxiliary battery cell.

17. The protecting case of claim 16, wherein the connection terminal comprises a connection jack to be inserted into a terminal hole disposed in the electronic device.

18. The protecting case of claim 16, wherein the sliding case portion further comprises an external terminal hole electrically connected according to insertion of an external terminal.

19. The protecting case of claim 1, wherein the controller is configured to charge the battery cell of the electronic device in response to the controller powering on the sliding case portion, and to charge the auxiliary battery cell in response to completing the charging of the battery cell.

20. The protecting case of claim 1, further comprising charging lamps that sequentially emit light in a clockwise direction to indicate a charging state of the auxiliary battery cell and are sequentially extinguished in a counterclockwise direction to indicate a discharging state of the auxiliary battery cell.

* * * * *